United States Patent [19]

Pendleton

[11] 4,223,697
[45] Sep. 23, 1980

[54] CHECK VALVE

[75] Inventor: Jack G. Pendleton, Coffeyville, Kans.

[73] Assignee: Judd Valve Company, Inc., Tulsa, Okla.

[21] Appl. No.: 929,648

[22] Filed: Jul. 31, 1978

[51] Int. Cl.³ .............................................. F16K 15/03
[52] U.S. Cl. ................................ 137/527.8; 251/357; 251/DIG. 1
[58] Field of Search .................. 137/516.29, 518, 521, 137/527, 527.2, 527.4, 527.6, 527.8; 251/298, 299, 303, 332, 357, DIG. 1

[56] References Cited

U.S. PATENT DOCUMENTS

| 2,918,934 | 12/1959 | Wheatley | 137/527.2 |
| 3,612,098 | 10/1971 | Bora | 137/527 |
| 4,054,153 | 10/1977 | Guyton | 137/527 |

FOREIGN PATENT DOCUMENTS

| 1168719 | 4/1964 | Fed. Rep. of Germany | 137/527 |
| 1397393 | 6/1975 | United Kingdom | 137/527.2 |

Primary Examiner—Robert G. Nilson
Attorney, Agent, or Firm—James H. Chafin

[57] ABSTRACT

A flow through check valve having a covered access port and a pivotal clapper member, the valve body and access port cover providing a recess to completely receive the clapper member out of the flow stream such that the clapper member never comes into contact with the access port cover. The clapper member is provided with a modified rabbet cut recess for receiving an O-ring therein which results in a reduction in weight, a reduction of manufacturing costs and ease of replacement of the O-ring.

4 Claims, 4 Drawing Figures

CHECK VALVE

BACKGROUND OF THE INVENTION

1. Field of the Invention

The present invention relates to check valves, and more particularly but not by way of limitation, to a flow through check valve having improved flow characteristics and improved O-ring configuration.

2. History of the Prior Art

The prior art is replete with in-line check valves wherein a clapper member is pivotally mounted within the valve body and prevents flow in one direction by falling down into the flow stream and into contact with a valve seat also provided in the valve body.

It is desirable in many pipeline type uses that when the valve is in an open position, flow is completely unobstructed for the obvious purpose of preventing impedement of the flow of fluid therethrough and for the additional purpose of allowing a pipeline pig or other solid object to be passed through the pipeline and not be obstructed by the valve itself.

One such common check valve is taught in the patent to Wheatley, U.S. Pat. No. 2,918,934 issued Dec. 29, 1959 for a "Check Valve." Whereas the Wheatley valve included a recess near the access port to receive the valve clapper in the open position as shown in FIG. 1 thereof, it is seen that when the valve opened rapidly, which is often the case, the clapper would stop against the threaded portion of the access port cover thereby causing damage to the threads and often making removal of the access cover extremely difficult if not impossible.

In an attempt to solve this problem, many valve manufacturers then reduced the access opening causing the clapper to hit against the internal surface of the valve body rather than make contact with the access port cover. Often, since the valve body is enlarged to make room for the clapper, the volume of fluid through the valve was not impeded even though a portion of the clapper extended down into the flow stream. This provides no problem in allowing the passage of fluid through the valve but often presents a problem when a pig or other pipeline operation device is passed through the valve.

The typical valve clapper as taught in the patent to Wheatley is provided with a sealing member such as an O-ring around the upstream face thereof to provide a tight seal when the clapper is in place against the valve seat.

In order to prevent these O-rings from washing out of the clapper, the O-ring groove is made in the form of a dovetail annular groove so that the O-ring is literally stuffed inside the dovetail annular groove. It has been found that one of the primary causes for the washing out of the O-ring seal was that the clapper did not move fully up out of the flow stream after the valve had been modified to prevent the clapper from doing damage to the access cover. This particular dovetail annular groove for receiving the O-ring represents a great deal of manufacturing costs of the clapper and further gives rise to problems in installing the O-ring itself.

SUMMARY OF THE PRESENT INVENTION

The present invention provides a flow through check valve wherein the open position the clapper member of the check valve moves completely up into a recess which is provided in two parts, a portion of which is inside a dome shaped access port cover, and the remainder of which is provided in the valve body itself. The valve body provides the stop for the clapper and yet allows the clapper to move completely out of the flow stream in the open position.

Further, since the clapper is able to move completely out of the flow stream in the open position, the clapper has been changed to provide a modified rabbet cut around the inlet face thereof which forms a V-shaped groove for receiving the O-ring therein.

Further, the clapper may be slightly reduced in size since the rabbet cut groove takes less space than the dovetail groove which allows a reduction in valve body diameter.

This V-shaped groove is far easier to manufacture than the dovetail groove and hence greatly reduces the cost and time of manufacturing of the valve.

One advantage to the user is a cost savings and a second important advantage is the ease of replacement of the O-ring.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 2:
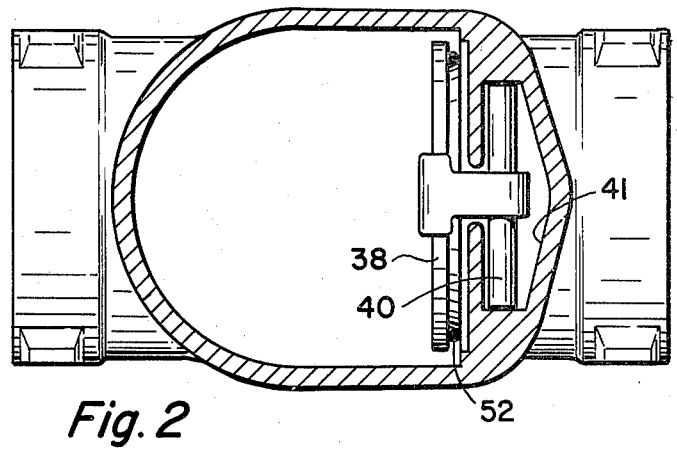
FIG. 2 is a plan sectional view of the check valve of FIG. 1 taken along the broken lines 2—2 of FIG. 1.

Referring to the drawings in detail, reference character 10 generally indicates a check valve having a valve body 12, an inlet port 14 and an oppositely disposed aligned outlet port 16. The inlet and outlet ports 14 and 16 are shown as being provided with internal threads but may be of substantially any configuration to receive pipe segments 18 and 20 therein. The valve body is provided with an upwardly extending sleeve member 22 which provides a threaded access port 24 into the interior of the valve body 12. A dome shaped access port cover 26 is threadably disposed in the threaded port 24 and is sealed with respect thereto by a suitable O-ring 28. The dome shape of the access port cover 26 provides an internal recess depicted by reference character 30. The upper part of the valve body adjacent the outlet port is also provided with a recess area indicated by reference character 32 and also provides a surface stop area 34 for a purpose that will be hereinafter set forth.

Figure 1:
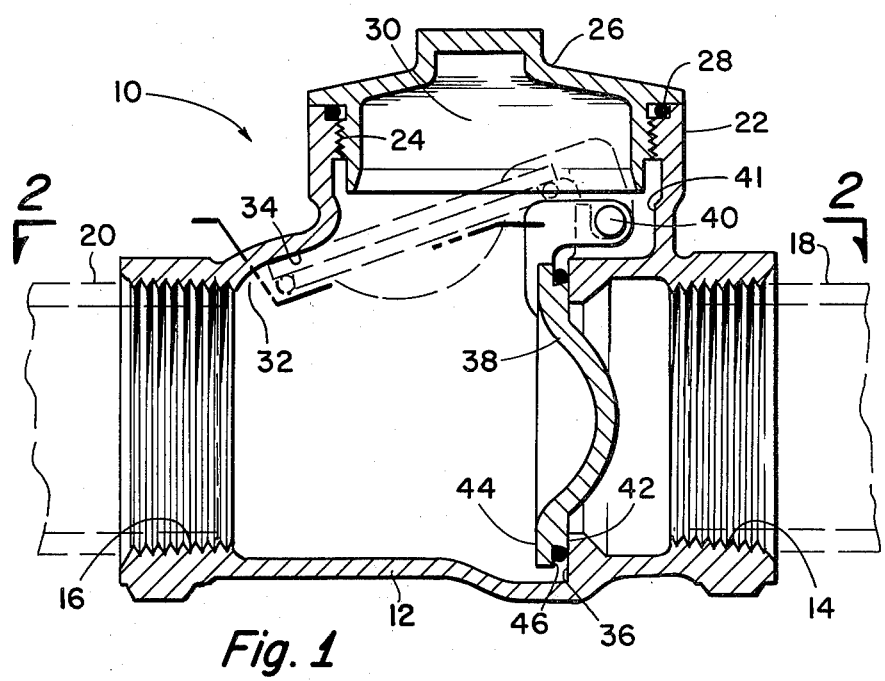
FIG. 1 is a side elevational sectional view of a check valve embodying the present invention.
Figure 3:
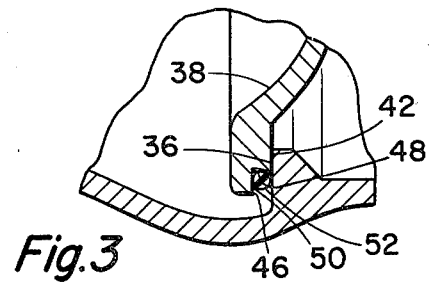
FIG. 3 is a detailed view of the clapper and valve seat of the valve of FIG. 1.

The valve body also includes an annular valve seat 36 adjacent the inlet port thereof. The valve also includes a clapper member 38 which is pivotally disposed within the valve body by means of a suitable horizontally oriented pivot pin 40 which is disposed within a recess 41 within the sleeve member 22. The clapper member 38 is provided with an inlet annular surface 42 for seating against the valve seat 36 in a closed position as shown in FIGS. 1, 2 and 3. There is an opposite annular surface on the downstream side of the clapper identified by reference character 44, a portion of which, when the clapper goes to the open position, will strike and come to rest against the inside surface of the valve body at stop area 34 in the recess 32.

The annular sruface 42 of the clapper member 38 is provided with an annular rabbet cut 46 therearound, the wall 48 of said rabbet cut being at an acute angle with respect to the floor 50 of said rabbet cut to provide a V-shaped groove therearound. An ordinary O-ring 52 is then inserted in the V-shaped groove 46 to provide a seal between the clapper member 38 and the valve seat 36.

Figure 4:
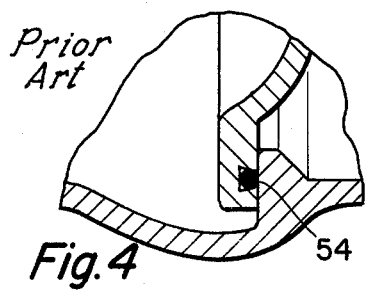
FIG. 4 is a partial sectional view of the prior art valve clapper having a dovetailed sealing groove.

Referring now to FIG. 4, it can be seen that the clapper is provided with a dovetailed groove for receiving an O-ring or sealing member 54 therein.

It is therefore readily apparent that it would be much less expensive and less time consuming to provide a rabbet cut as taught in the present invention over the machining of a dovetail groove in the clapper body as taught by the prior art.

Further it can be seen that when the clapper is in the full open position, as shown in FIG. 1, the O-ring 52 thereof is moved out of the mainstream flow and is less likely to be washed out than in the prior art devices wherein a portion of the clapper extends down into the main fluid stream (not shown).

Further, it is less likely that the O-ring will be washed out in the present configuration by constructing the O-ring with a slightly smaller diameter than that of the V-shaped groove so that the O-ring needs to be slightly expanded for installation in the groove. However, even though the O-ring would need to be slightly stretched to be fit into the V-shaped groove, installation is much more simple than that of having to physically stuff the O-ring or sealing member into a dovetail groove as required in the prior art devices.

Whereas, the present invention has been described in particular relation to the drawings attached hereto, other and further modifications apart from those shown or suggested herein may be made within the spirit and scope of the invention.

What is claimed:

1. In a check valve having a valve seat and a cooperating pivotally mounted clapper member, said clapper member having a closed surface area for contacting said valve seat, an improvement comprising:
   a substantially V-shaped recess provided in the clapper member closed surface area and an O-ring disposed in said V-shaped recess the cross-sectional angle of said V-shaped recess being acute.

2. A check valve as set forth in claim 1 wherein the valve seat and clapper member closed surface area is annular in shape and wherein the substantially V-shaped recess comprises a rabbet cut around the outer periphery of said closed surface area, the wall of said rabbet cut making an acute angle with respect to the floor of the rabbet cut.

3. A check valve as set forth in claim 2 wherein the O-ring diameter is smaller than the diameter of the V-shaped recess whereby said O-ring is slightly stretched when installed in the V-shaped recess.

4. A flow-through check valve comprising:
   (a) a valve body having aligned inlet and outlet ports;
   (b) a valve seat interposed between the inlet and outlet ports, said valve seat being an annular surface;
   (c) an access port provided in the valve body interposed between the inlet and outlet ports, an access port cover removably secured to the access port to provide access to the interior of the valve body;
   (d) a clapper member pivotally secured to the valve body in the proximity of the valve seat, said clapper member comprising an annular member closing surface on one face thereof, a V-shaped rabbit-cut recess around the outer periphery of the closing surface, the inner wall of said rabbit-cut recess forming an acute angle with the floor of said recess for receiving an O-ring therein;
   (e) a clapper receiving recess for completely receiving the clapper member out of the flow path in the open position;
   (f) a stop member carried by the valve body separate from the access port cover to prevent the clapper from contacting any part of the access port cover; and
   (g) an O-ring carried by the V-shaped rabbit-cut recess in the clapper member.

* * * * *